United States Patent [19]
Balbachan

[11] Patent Number: 5,838,157
[45] Date of Patent: Nov. 17, 1998

[54] DEVICE FOR MEASURING ELECTRICAL FIELD GRADIENT COMPONETS OF THE SOIL

[76] Inventor: Michail Balbachan, 5 Sherbakovskaya Street., Apt. 10, Moscow, Russian Federation, 105318

[21] Appl. No.: 736,134

[22] Filed: Oct. 24, 1996

[51] Int. Cl.[6] .............................. G01V 3/08; G01V 3/38; G01R 29/00
[52] U.S. Cl. ........................ 324/348; 324/72; 324/347; 340/690
[58] Field of Search .......................... 324/344, 347–350, 324/354, 72, 425, 457, 690; 340/601, 690

[56] References Cited

U.S. PATENT DOCUMENTS

| | | | |
|---|---|---|---|
| 2,344,672 | 3/1944 | Blasier | 324/348 X |
| 3,087,111 | 4/1963 | Lehan et al. | 324/344 |
| 3,319,157 | 5/1967 | York | 324/354 |
| 5,387,869 | 2/1995 | Enomoto | 324/348 |

*Primary Examiner*—Gerard R. Strecker
*Attorney, Agent, or Firm*—Boris G. Tankhilevich

[57] ABSTRACT

An apparatus for measuring the vertical component of the gradient of the electrical field of the soil surface includes two electrodes. Each electrode includes a capacitor with a semi-conductor layer.

5 Claims, 2 Drawing Sheets

DEVICE FOR MEASURING ELECTRICAL FIELD GRADIENT COMPONETS OF THE SOIL

BACKGROUND

The electrical parameters of soil (such as a vertical component of the gradient of the electrical field within a layer of soil) usually can be measured by a standard voltmeter including a pair of electrodes. One such electrode should be placed underneath the soil, the second such electrode should be placed on the earth surface.

However, in case of incoming earthquake the parameters of soil are quite unique. The complete discussion can be found in the U.S. patent application Ser. No. 08/736,136. The current patent application incorporates the U.S. patent application Ser. No. 08/736,136 in its entirety.

Indeed, in case of an incoming earthquake the tectonic processes which lead to the eruption of an earthquake always proceed with changes in the vicinity of the earth's crust. These changes manifest themselves typically as pressure changes and changes in the chemical composition of the water of the earth's crust. The change in the chemical composition of the water of the earth's crust can be either an indirect consequence of the change in pressure or a direct consequence of chemical processes.

Almost everywhere the rocks are permeated by ground water. This water saturates the rocks and fills up the cracks and pores within them.

It is assumed that the soil contains massive rocks, including piezoelectric minerals like quartz, separated from the surface of the earth by the layer of the brittle rocks. The depth of the layer of brittle rocks is small in comparison with the depth of the massive rock itself which can constitute miles. The typical depth of the layer of the brittle rocks is about one meter. The ground water saturates the rocks and fills up the cracks and pores within them. The ground water after reaching the earth surface naturally evaporates. It has been discovered (see U.S. patent application Ser. No. 08/736,136 entitled "Earthquake forecast method and apparatus") that during the natural water evaporation from the surface of the earth, the vertical electrical field ($U_h$) is formed in the soil because this capillary effect causes the ground water to have the number of positive ions in excess of the number of negative ions. This is explained by the fact that when water contacts hard minerals, usually double electrical layers are formed which are positively charged at the water side.

The intensity of the ground water evaporation is determined by the earth's surface temperature $T_s$. Thus, there is a correlation K between the changes in the vertical component of the gradient of the electrical field $U_h$ associated with the ground water evaporation, and the changes in the earth's surface temperature $T_s$. As was indicated above, in the absence of earthquake there is a surplus part C of positive ions in the ground water. Therefore, the correlation factor K is positive. The positive correlation K means that the more evaporation of the ground water from the earth surface takes place, the stronger is the vertical component of the gradient of electrical field $U_h$.

The elastic deformation of the rocks during the earthquake preparation causes the redistribution of the ions between the ground water in the area between the layer of quartz containing rock and the earth's surface. The redistribution of ions is related to the piezoelectric effect in the layer of quartz. Indeed, the piezoelectrical effect leads to such an ion concentration redistribution in the double electrical layers at the border where water contacts quartz, that some amount of the negatively charged ions leaves the quartz containing volume. The effect is proportional to the deformation speed. Therefore, the correlation factor K becomes negative. The maximum amount of the charge redistribution in the diffused ground water occurs when that water changes its polarity from plus to minus. If this is the case, the correlation factor K becomes close to minus one. This corresponds to the extremum of the velocity of pressure and to the maximum of the piezoelectric effect in the layer of quartz associated with the earthquake preparation. Thus, the correlation parameter K is a function of time $\tau$ between the present moment and the time of the occurrence of the impending earthquake: $K(\tau)$. It is also clear that the deformation of the quartz minerals is used to store the elastic energy released by an impending earthquake, and therefore can be used to predict the forthcoming earthquake.

However, in order to make the earthquake prediction possible it is necessary to measure only strong variations of the vertical gradient of the electrical field associated with the ion concentration redistribution in the double electrical layers at the border where water contacts quartz. Thus, what is needed is a device that allows one to perform the measurements of strong variations of the vertical gradient of the electrical field of the soil $U_h$ associated with the incoming earthquake.

SUMMARY

The present invention is unique because it allows one to achieve the measurements of strong variations of the vertical gradient of the electrical field of the soil $U_h$ associated with the incoming earthquake.

One aspect of the present invention is directed to a device for measuring the vertical component $U_h$ of the electrical field gradient of the soil. The device comprises: (1) at least two electrodes, a temperature sensor, and a humidity sensor; and (2) a measurement and control device. Each electrode further comprises: (1) a first conductive element; (2) a second conductive element; and a capacitor element having a finite resistance to d. c. current, and having a substantially large effective electrical capacitance.

The vertical component $U_h$ of the electrical field gradient of the soil is measured by the measurement and control device.

In the preferred embodiment, the capacitor further comprises: (1) a first conductive plate; (2) a second conductive plate; and (3) a layer of semiconductor. In one embodiment, the layer of semiconductor further includes an organic semiconductor. In another embodiment, the layer of organic semiconductor further includes a polyanilin organic semiconductor. In the preferred embodiment, the capacitor has a capacitance greater than 0.001 farad (F).

Another aspect of the present invention is directed to an apparatus for predicting an earthquake. The apparatus comprises: (1) sensing circuit for measuring the parameters of soil and for generating a sensing signal; (2) a processing circuit for receiving the sensing signal (SS), for processing the sensing signal, and for generating a prediction signal (PS); (3) a receiving circuit for receiving a command signal from a central station to initiate the transmission of the PS signal; and (4) a transmitting circuit for transmitting the PS signal to a customer.

In the preferred embodiment, the sensing circuit further includes: (1) a water humidity sensor for monitoring the soil humidity changes W; (2) a temperature sensor for measuring the temperature $T_s$ of the soil surface; and (3) a pair of electrodes for measuring the vertical component $U_h$ of the electrical field gradient associated with the mechanical movement of the soil water, a first electrode being located at a certain depth $h_0$ beneath an earth surface, wherein the depth $h_0$ is determined by the depth of the quartz containing hard rock layer, and a second electrode being located beneath the earth surface at a certain depth $h_1$ substantially close to the earth surface.

In the preferred embodiment, each electrode further comprises: (1) a first conductive element; (2) a second conductive element; and (3) a capacitor element; wherein the capacitor element has a finite resistance to d. c. current; and wherein the capacitor element has a substantially large effective electrical capacitance.

FULL DESCRIPTION OF THE PREFERRED EMBODIMENT

Figure 1:
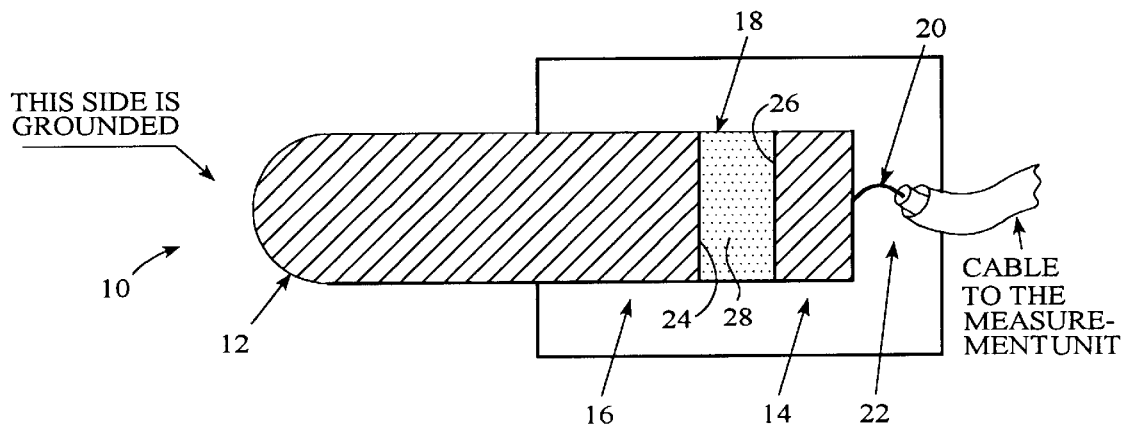
FIG. 1 depicts a scheme of an electrode.

FIG. 1 depicts a scheme of an electrode (10) that can be used for measurement of the electrical parameters of the soil that constitutes the subject matter of the present invention. In the preferred embodiment, the electrode (10) further comprises:. (1) a first conductive element (12), (2) a second conductive element (14); and a capacitor element (18).

In one embodiment, both the first conductive element (12) and the second conductive element (14) comprise a graphite element.

The capacitor should have a very substantial capacitance greater than 0.001 farad (F). If this is the case the pair of electrodes (10) can be used for purposes of measurement the major variations in the vertical gradient of the electrical field associated with the forthcoming earthquake. Indeed, the minor variations in the vertical component of the electrical field associated with the sources other than incoming earthquake are filtered out because the apparatus (40) of FIG. 2 including the electrodes (10) of FIG. 1 does not react on the minor variations of the vertical component of gradient of the electrical field.

In the preferred embodiment, the capacitor element (18) includes a layer of semiconductor (28) between the first conductive element (12) having an ending element (24) and the second conductive element (14) having an ending element (26). The layer of semiconductor (28) can include an organic semiconductor. In another embodiment, the capacitor (18) comprises a tablet of a polyanilin and graphite composition. In both of these embodiments, the capacitor has a very substantial capacitance greater than 0.001 farad (F).

The insulator (16) insulates the capacitor element and the second conductive element of the electrode from the contact with the soil water. The wire (20) connects the electrode with the cable (22) that further connects the electrode with the measurement device (40) of FIG. 2.

Figure 2:
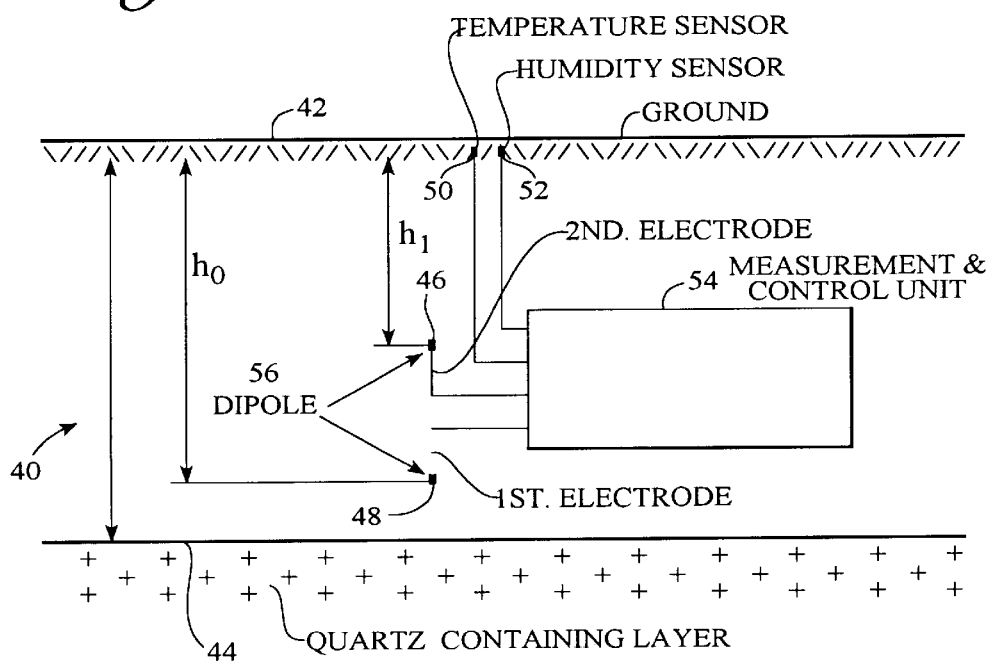
FIG. 2 is an illustration of an apparatus for measuring electrical parameters of the soil.

As depicted in FIG. 2, the vertical component $U_h$ of the electrical field gradient of the soil is measured by the measurement and control device (40). The full description of the device (40) can be found in the copending and filed on the same date U.S. patent application Ser. No. 08/736,136 entitled "Earthquake forecast method and apparatus" that is incorporated by reference herein .

The first electrode (48) (the construction of which is fully described above in reference to FIG. 1) is located at certain depth $h_0$ beneath the earth surface sufficiently close to the quartz containing layer (44). In the preferred embodiment, $h_0=1$ meter. The second electrode (46), that has the same construction as the first electrode (48), is located beneath the earth surface at a certain depth $h_1$ substantially close to the earth surface. In the preferred embodiment, $h_1=(0.1-0.3)$ meters. The two electrodes 48 and 46 form a vertical dipole (56) because the second electrode 46 is placed above the first electrode 48.

Figure 3:
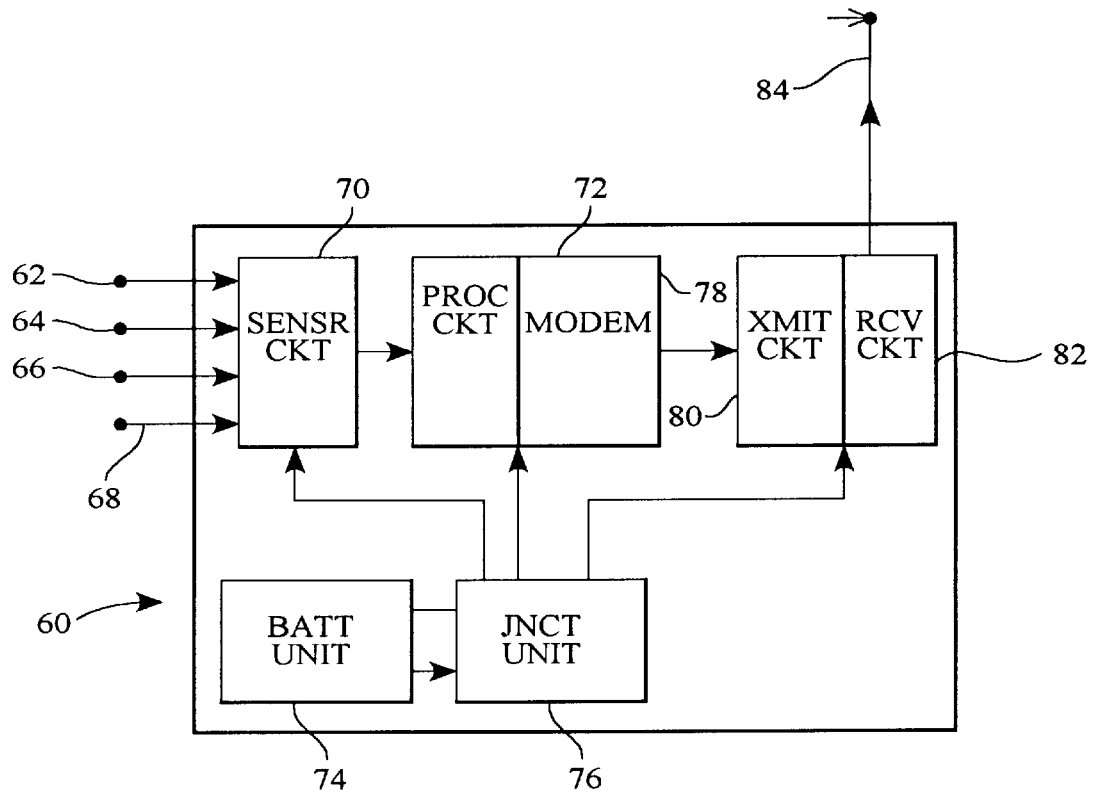
FIG. 3 shows an apparatus for predicting an earthquake.

FIG. 3 illustrates a device (60) for predicting an earthquake that utilizes the described above electrodes of FIG. 1. The apparatus (60) comprises: (1) a sensing circuit (70) for measuring the parameters of soil and for generating a sensing signal; (2) a processing circuit (72) for receiving the sensing signal (SS), for processing the sensing signal, and for generating a prediction signal (PS); (3) a receiving circuit (82) for receiving a command signal from a central station to initiate the transmission of the PS signal; and (4) a transmitting circuit (80) for transmitting the PS signal to a data processing center. The full description of the device (60) can be also found in the copending and filed on the same date U.S. patent application Ser. No. 08/736,136 entitled "Earthquake forecast method and apparatus" that is incorporated by reference herein.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A device for measuring the vertical component $U_h$ of the electrical field gradient of the soil, said device comprising:
    at least two electrodes; wherein each said electrode further comprises:
        a first conductive element connected to the soil;
        a second conductive element adapted for connection to a measuring and control device; and
        a capacitor element connected to said first conductive element and connected to said second conductive element; wherein said capacitor element further comprises:
            a layer of dielectric between said first conductive element and said second conductive element, wherein said first conductive element includes a first conductive ending element connected to said dielectric, and wherein said second conductive element includes a second conductive ending element connected to said dielectric;
    wherein said capacitor element has a finite resistance to d. c. current; and wherein said capacitor element has a substantially large effective electrical capacitance.

2. The device of claim 1, said capacitor element further comprising:
    a layer of semiconductor connected to said first conductive ending element and connected to said second conductive ending element.

3. The device of claim 2, wherein said layer of semiconductor further includes:
    an organic semiconductor.

4. The device of claim 3, wherein said layer of organic semiconductor further includes:
    a polyanilin organic semiconductor.

5. The device of claim 2; wherein said capacitor includes:
    a capacitor having capacitance greater than 0.001 farad (F).

* * * * *